US006292262B1

(12) United States Patent
Ciani et al.

(10) Patent No.: US 6,292,262 B1
(45) Date of Patent: Sep. 18, 2001

(54) METHOD AND DEVICE TO MEASURE THE GAP BETWEEN VARIABLE-POSITION ELEMENTS

(75) Inventors: Lorenzo Ciani, Udine; Ferruccio Della Vedova, Zugliano, both of (IT)

(73) Assignee: Centro Automation SpA, Buttrio (UD) (IT)

( * ) Notice: Subject to any disclaimer, the term of this patent is extended or adjusted under 35 U.S.C. 154(b) by 0 days.

(21) Appl. No.: 09/460,973

(22) Filed: Dec. 15, 1999

(30) Foreign Application Priority Data

Dec. 21, 1998 (IT) ........................................ UD98A0222

(51) Int. Cl.[7] ................................................ G01B 11/14

(52) U.S. Cl. ........................... 356/375; 72/21.1; 72/11.6; 73/37

(58) Field of Search .................................... 356/372, 375, 356/373, 32, 381; 73/800, 788; 72/37, 21.1, 16, 35, 11.6, 12.7, 8.9; 348/82

(56) References Cited

U.S. PATENT DOCUMENTS 3,640,109 * 2/1972 Ashton et al. .......................... 72/37
3,834,820 9/1974 Bock .
4,549,207 * 10/1985 Boshier ............................... 356/381
4,821,544 * 4/1989 Tamler et al. .......................... 72/16
4,837,615 * 6/1989 Boshier ................................. 348/82
5,206,703 * 4/1993 Holmes et al. ..................... 356/372
5,416,590 * 5/1995 Stover et al. ........................ 356/375
5,533,371 * 7/1996 Frischknecht et al. ............... 72/21.1
5,726,907 3/1998 Davidson et al. .
5,791,182 * 8/1998 Ciani .................................... 72/11.6

FOREIGN PATENT DOCUMENTS 4037934 5/1992 (DE) .
2641373 7/1990 (FR) .

OTHER PUBLICATIONS

Patent Abstracts of Japan, vol. 6, No. 229, Nov. 16, 1982 for JP 57 132009 dated Aug. 16, 1982.

* cited by examiner

*Primary Examiner*—Frank G. Font
*Assistant Examiner*—Sang Hoang Nguyen
(74) *Attorney, Agent, or Firm*—Stevens, Davis, Miller & Mosher, L.L.P.

(57) ABSTRACT

Device and method to measure the gap between substantially static elements with a variable reciprocal position, used to adjust the reciprocal position of said elements to obtain a desired transit gap, comprising visual recording means connected to a processor equipped with at least display means, said processor being suitable to receive the images filmed by said visual recording means and to automatically compare said images with at least a pre-selected sample mask substantially reproducing the desired gap to be obtained, said processor being suitable to display, in numerical form on appropriate interface windows, the dimensional discrepancies between the image relating to the actual transit gap defined by said elements as filmed by said means, and said pre-selected sample mask.

19 Claims, 2 Drawing Sheets

15 12 d 10 A 19 13 20 21 35 11 14a 23 22 17 18 33 16 14

METHOD AND DEVICE TO MEASURE THE GAP BETWEEN VARIABLE-POSITION ELEMENTS

FIELD OF THE INVENTION

This invention concerns a method and the relative device to measure the gap between two or more substantially static elements whose reciprocal position may be variable with respect to a pre-defined reference value, as set forth in the relative main claims.

The invention allows to measure, via optical means, the transit gap defined between two or more elements, in order to provide the worker with the instructions necessary to regulate, in an extremely rapid and precise manner, the position of the elements so as to predispose them for subsequent use.

The invention also allows to control the congruity of the profile of the actual gap with respect to a pre-set reference model.

The invention is suitable to be used in particular, though not exclusively, in the metallurgical field in order to regulate, according to a pre-defined setting mask, the gap between two rollers of a guide box for rolled stock, or the gap between the rolls of a rolling stand, or to verify the alignment between two or more boxes, between the box and the relative stand or between two or more stands. In the following description, for the sake of simplicity, we shall refer to this particular application, but this shall not be restrictive for the invention.

BACKGROUND OF THE INVENTION

In many different fields, the state of the art includes the need to position two or more elements in a reciprocal, pre-set position defining a transit gap, with an extremely high level of precision.

In the metallurgical field, for example, the state of the art covers the need to regulate the position of the shaped rollers of the boxes which guide the rolled stock in order to adapt the gap which they define to the section of rolled stock which has to be guided, or to regulate the position of the shaped working rolls in rolling stands in order to gauge the gap which they define so as to produce rolled stock of the pre-set section, with extremely limited margins of tolerance.

At present, these regulations are done manually by the workers using specific equipment and conventional measuring methods, which are not very precise or reliable.

Measurements made with traditional methods, moreover, must be repeated by the worker several times during the regulation of the rollers or rolls, until the pre-set parameters are achieved.

It is a well-known practice to make the measurements by means of a viewer, which uses an opalized screen and a system of optical amplification to monitor the profile and the dimension of the transit gap defined between two rollers or rolls. However, this system is also manual and does not ensure a reliable result.

At the present time, then, it is extremely complicated to measure and regulate the gap and the alignment between two variable-position elements, in this case rolls and rollers, and it requires a lot of time and specialised staff.

The speed of performance and the results obtained, moreover, are closely connected to the worker, his experience and the technique he uses. FR-A-2.641.373 discloses a distance measuring device to measure the deformations of an object which is rotating at high speed in a vacuum container due to the centrifugal forces acting thereon.

The device comprises a light-emitting element consisting of a stroboscope, whose emission frequency is synchronized to the speed of rotation of the object, a first lens on which the real image of the object obtained with every emission of a stroboscopic impulse is reproduced, a graduated grid on which the real image is superimposed, and a second lens, with an enlarging function, arranged on the other side of the grid with respect to the first lens.

The solution proposed by FR '373 is complex because it requires two distinct lenses, one to represent the rotating object on a scale of 1:1 and one to enlarge the image, and a grid located between the two lenses to visually quantify the deformation of the object.

Moreover, this solution entails an intrinsic difficulty of synchronizing the stroboscopic light and the speed of rotation of the object.

Furthermore, the deformation has to be visually quantified and interpreted on the grid, and is therefore subjective, not very precise, and not very reliable.

This solution therefore does not overcome the problems of the state of the art as explained above.

The present Applicant has designed and embodied this invention to overcome this shortcoming which many people complain of in the state of the art, and particularly in the metallurgical field, and also to obtain further advantages as will be shown hereafter.

SUMMARY OF THE INVENTION

The invention is set forth and characterised in the respective main claims, while the dependent claims describe other characteristics of the invention.

The main purpose of the invention is to provide a method and the relative device to measure and regulate the transit gap defined between variable-position elements so as to simplify, accelerate and standardise the operations to set and predispose these elements according to the value required by the working specifications.

Another purpose of the invention is to carry out extremely precise measuring operations which will be immediately available to the workers in numeric form, and therefore entirely without possible errors of interpretation and evaluation by the workers, so as to guide them progressively in the setting and pre-arranging operations.

A further purpose of the invention is to render the measurements independent of the worker and therefore to allow even non-specialised or inexperienced workers to position and regulate the aforesaid elements.

Another purpose is to provide equipment of a size which can be transported and easily installed in any working environment whatsoever, simple to prepare and to work since it does not need any complicated procedures of synchronization or fine-tuning.

The device according to the invention comprises, in its essential parts, visual recording means consisting of at least a TV camera connected to a processor suitable to receive and process the images filmed by the TV camera.

In one embodiment of the invention, the TV camera cooperates with a light source suitable to increase the definition of the images filmed.

According to a preferential embodimient, the light source is aligned with the TV camera and is located on the opposite side of the TV camera, with respect to the elements to be filmed.

The method according to the invention provides to align the TV camera with the transit gap defined between the elements to be regulated, and to compare the images filmed by the TV camera with a defined sample mask, or setting mask.

The sample mask can be selected by the worker from among those contained in an archive in the processor, or can be acquired by the processor by means of a previous gauging procedure.

In one embodiment of the invention, the sample mask consists of a digital image. According to a variant, the sample mask consists of a drawing made with a CAD program.

The invention allows to provide automatically to the operator, in real time and continuously, all the information, or data, concerning the differences found by the processor between the image filmed by the TV camera and the sample mask.

To be more exact, the data is expressed and displayed as numerical values relating to the discrepancies on every dimension, such as for example height, width, interaxis, etc., between the image filmed by the TV camera and the sample mask used as setting, preparation and comparison datum.

According to a variant, the processor also provides information on the congruity of the profile of a part or all of the image filmed with respect to the profile of the sample mask, in the event that the transit gap subjected to gauging defines a particular geometric profile, as happens for example with the rolls of rolling stands.

According to one characteristic of the invention, this information is immediately and continuously made available to the worker by means of interface means, such as for example a monitor.

With the method according to the invention, therefore, it is possible to guide the worker in the adjustment of the elements filmed by the TV camera and to obtain the perfect match between the real image and the sample mask, or setting mask.

DESCRIPTION OF THE DRAWINGS

These and other characteristics of the invention will become clear from the following description of some preferred forms of embodiment, given as non-restrictive examples, with reference to the attached drawings, wherein.

DETAILED DESCRIPTION OF PREFERRED EMBODIMENTS

Figure 1:
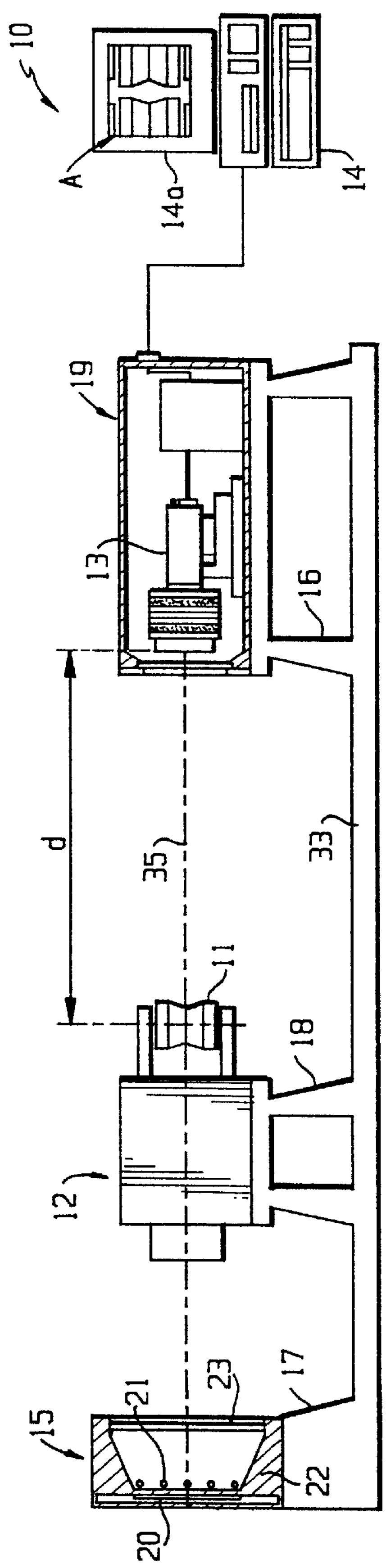
FIG. 1 is a side view of the device to measure the gap used to regulate the rollers of a box to guide the rolled stock of a rolling plant.

With reference to FIG. 1, a device 10 to measure the gap defined between variable-position elements is used to regulate and set the position of the rollers 11 of a box 12 to guide the rolled stock in a rolling plant. The device 10 comprises in its essential parts a TV camera 13, a processor 14 and a rear-illuminating light source 15.

In this case, the device 10 according to the invention is installed in a place where boxes 12 to guide the rolled stock are achieved and predisposed; both the camera 13 and the light source 15 and also the box 12 are positioned on respective fixed supports 16, 17 and 18.

The fixed supports 16, 17 and 18 are assembled, in predetermined positions, on a common base 33 in such a manner as to always respect defined geometric positions, under particular conditions of reciprocal distance and collimation of the heights, of the camera 13, the box 12 and the light source 15.

In cooperation with the support 18 there may be means to regulate the height, such as shims, supports or similar, so as to allot the positioning of boxes 12 of different dimensions while still maintaining the geometric conditions of height, alignment and distance with respect to the camera 13 and the light source 15.

According to a variant, the camera 13 and light source 15 are movable and can be located in a different zone of use.

In this case, the camera 13 is enclosed in an airtight containing structure 19 which protects it from dirt, dust and any other possible external agents.

The camera 13 is connected to the processor 14, in this case a personal computer, and is suitable to continuously transmit thereto the images filmed.

The camera 13 is aligned to the transit gap 32 defined between the rollers 11 of the box 12, advantageously making the axis 29 of filming 35 pass through the nominal center 31 of the gap 32.

Figure 2:
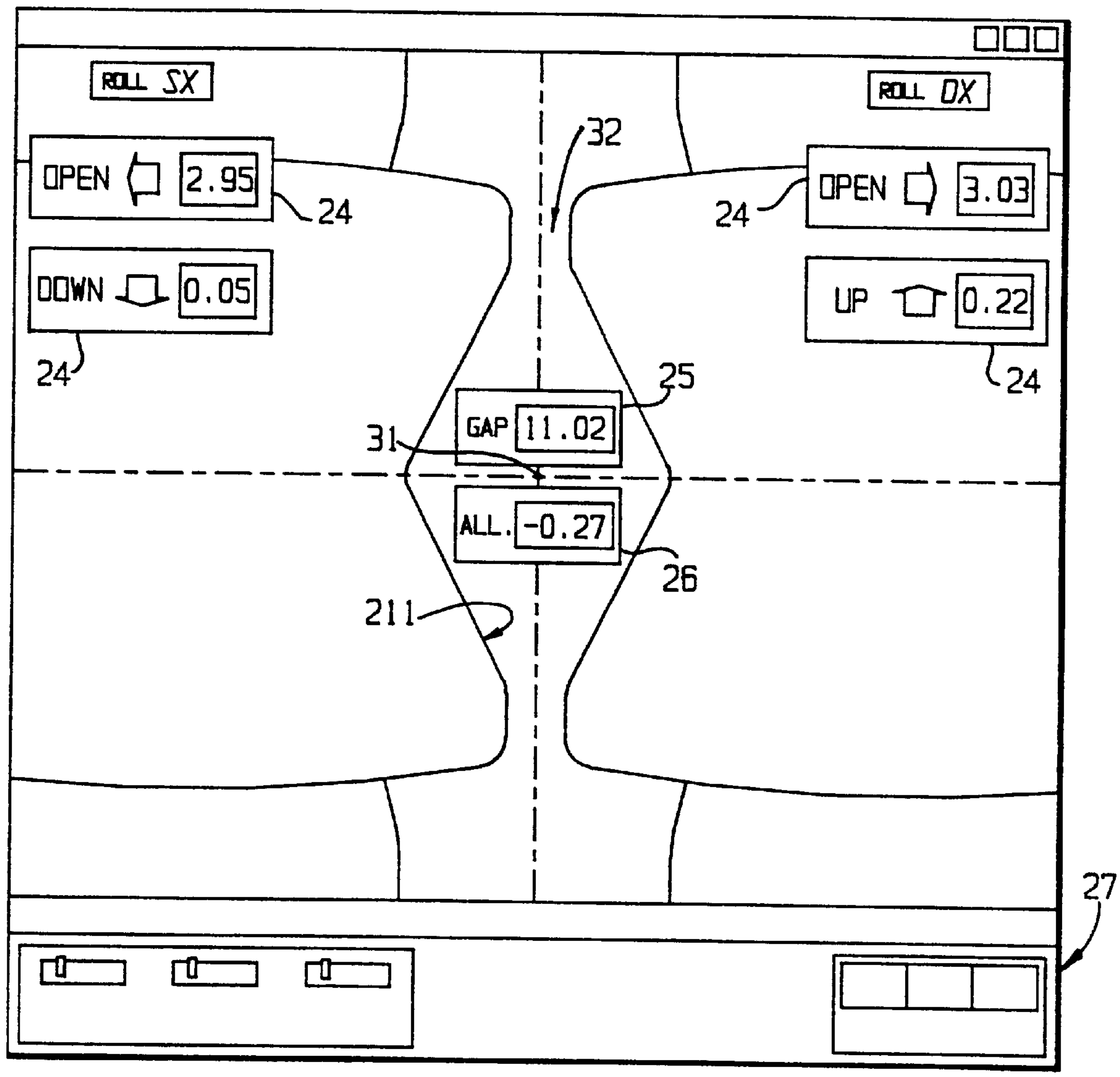
FIG. 2 shows the enlarged detail A of FIG. 1.

The images filmed by the camera 13 are displayed on the monitor **14*a*, as shown in FIG. 2, and compared by the processor 14**, by means of a specific program, with a sample setting mask such as a digital image or a drawing made with a CAD program.

In the configuration shown here, the invention provides to position the camera 13 at a pre-defined distance "d" from the rollers 11, so that the results of the comparison between the image acquired and the sample mask are precise and reliable.

According to a preferential embodiment, the camera 13 is equipped with a range finder or other similar instrument, suitable to transmit to the processor 14 the actual value of the distance "d"; this value is used to correct any possible mistakes in the measurement due to differences in the positioning of the camera 13 with respect to the predetermined distance by means of an appropriate correction factor which takes into account the actual distance.

The light source 15 is located behind the box 12 and, in the example shown here, comprises a plate 20 with a printed circuit on which a plurality of LEDs 21 are mounted.

The plate 20 is located inside a projector body 22, the inner surfaces of which are of the reflecting type and equipped at the front with a strip of glass 23, advantageously opalized.

The function of the light source 15, which can also be achieved in other ways, for example as an incandescent lamp or otherwise, is to illuminate the transit gap from the rear and therefore improve the quality of the images filmed by the camera 13.

In this way, the profile 211 of the rollers 11 appears on the monitor **14*a* (FIG. 2**) extremely clear and well defined, so that the comparison with the sample mask is extremely precise and easy to read.

The method according to the invention provides that the results of the comparison are displayed in real time in numerical form by the processor 14 on the monitor **14*a* by means of a plurality of interface windows 24, immediately intelligible; suitable to guide the workers in their operations to regulate the rollers 11**

In the example shown in FIG. 2, in order to obtain the pre-determined value of the transit gap and to correct the reciprocal position of the rollers 11, the worker has to displace the left-hand roller by 2.95 mm towards the outside, and by 0.05 mm downwards, at the same time displacing the right-hand roller by 3.03 mm towards the outside and by 0.22 mm upwards.

As the worker carries out these movements, the results displayed by the interface windows 24 are up-dated in real time, so as to guide the worker continuously and progressively until all the discrepancies with respect to the predefined values are substantially taken to zero.

The gap and alignment value of the two rollers 11 is displayed in real time by respective interface windows 25 and 26.

According to a variant, the numbers displayed by the windows 24, 25 and 26 are of different colors according to whether or not the gap and alignment value comes within a pre-determined field of tolerance, so as to facilitate the worker in his task.

For example, the values can be displayed in green when they come within the defined field of tolerance and in red when they do not.

The program of the processor 14 also allows to display on the monitor 14*a* further interface windows 27 which allow the worker to start the device 10, or to carry out specific functions such as for example to gauge the device 10 at the start of the measuring operations.

According to a variant, one of the interface windows 27 supplies information on the congruity of the profile of part or all of the image filmed with respect to the sample mask.

In one embodiment of the invention, the device 10 is gauged using a grid or a three-dimensional model of which one reference dimension is known.

According to a variant, the image of the three-dimensional model filmed by the camera 13 is acquired and memorised by the processor 14 and is then used as a sample mask.

Figure 3:
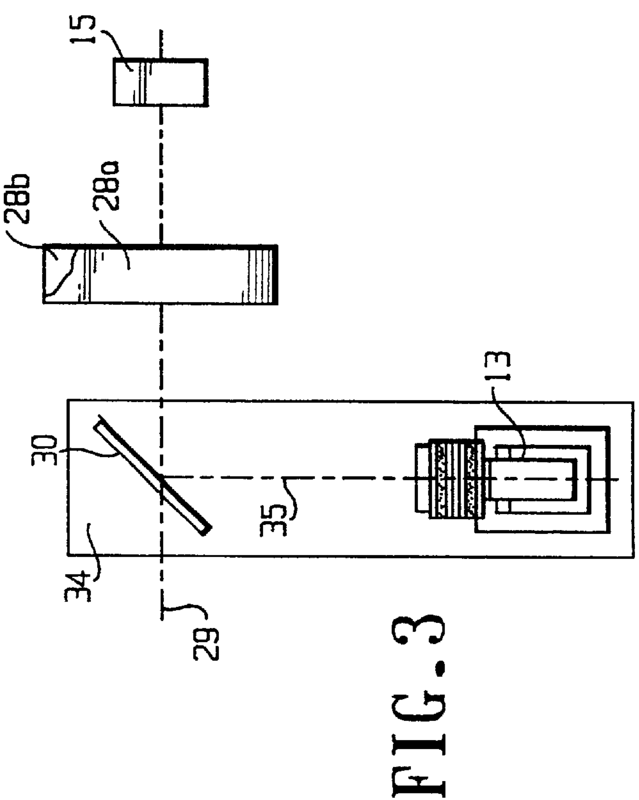
FIG. 3 is a part plane view of a variant of the device in FIG. 1 used to measure the gap between the working rolls in a rolling stand.

In the variant shown in FIG. 3, the device 10 according to the invention is used in a rolling plant to regulate the gap between two rolls, respectively 28*a* and 28*b*, already mounted in a rolling stand.

In this embodiment, the light source 15 is aligned with the rolling axis 29 of the plant while the camera 13 is located in a zone outside the plant itself, with the respective axis of filming 35 arranged substantially orthogonal to the rolling axis 29.

This solution is adopted when, for reasons of space, it is impossible to arrange the light source 15 and the camera 13 in line on one side and the other of the rolls 28*a* and 28*b*.

In this case the image of the gap defined between the two rolls 28*a* and 28*b* is filmed by the camera 13 by means of a mirror 30 inclined by a defined angle with respect to the rolling axis 29, in this case by 45°.

The mirror 30 is mounted on a common base 34 with the camera 13 so as to define precise reciprocal conditions of positioning, inclination and orientation in order to ensure a reliable measurement.

Advantageously the base 34 is mounted in place of the guide box provided in front of the rolls 28*a* and 28*b*, thus also allowing to provide indications on the correct alignment of the box and the rolls themselves.

It is obvious that modifications and additions may be made to the invention, but these shall remain within the field and scope thereof.

What is claimed is:

1. A device to measure a gap between substantially static elements with a variable reciprocal position, said device being suitable to regulate the reciprocal position of the elements and to obtain a transit gap with a desired size and profile, comprising:

a display means comprising interface windows, a visual recording means for filming at least one image relating to an actual transit gap defined by the elements, wherein said visual recording means is connected to a processor, a display means having an interface window wherein said processor is connected to said display means;

said processor being suitable to receive the at least one image filmed by said visual recording means, to automatically compare the at least one image with at least a pre-selected sample mask substantially reproducing the desired gap to be obtained and to calculate a plurality of dimensional discrepancies between the at least one image relating to the actual transit gap defined by the elements as filmed by said visual recording means and said pre-selected sample mask, and said processor being suitably connected to said display means to display, in numerical form on said interface windows, the dimensional discrepancies between the at least one image relating to the actual transit gap defined by the elements as filmed by said visual recording means, and said pre-selected sample mask.

2. The device as in claim 1, further comprising a common base, wherein said variable-position elements and said visual recording means are assembled on respective supports made at fixed and pre-set positions on the common base.

3. The device as in claim 1, wherein said display means comprise at least a monitor suitable to display the at least one image filmed by said recording means and a series of interface windows for at least one function selected from the group consisting of the numerical display of the dimensional discrepancies and to display information on the congruity of the profile of the at least one image with respect to the sample mask.

4. The device as in claim 1, wherein the visual recording means comprises a TV camera, and further comprising at least a light source to illuminate from behind the transit gap defined by the elements.

5. The device as in claim 4, further comprising a common base, wherein said variable-position elements and said visual recording means are assembled on respective supports made at fixed and pre-set positions on the common base, wherein said light source is assembled on a support made on said common base at a fixed distance from said supports of the variable-position elements and said visual recording means.

6. The device as in claim 4, wherein the light source comprises a projector body inside which is assembled a printed circuit board equipped with a plurality of LEDs.

7. The device as in claim 1, wherein between said visual recording means and said transit gap defined between the elements there is a reflector element inclined by a defined angle and suitable to reflect the image of said transit gap in the direction of said visual recording means.

8. The device as in claim 7, wherein the visual recording means and the reflector element are assembled in reciprocal fixed positions on a common base.

9. The device as in claim 1, wherein said visual recording means are enclosed in an air-tight containing structure suitable to preserve said visual recording means from outside agents.

10. The device as in claim 1, wherein the substantially static elements comprise a member of the group consisting of:

two rollers in a guide box for rolled stock, two rolls of a stand, two guide boxes, a box and a stand, and two stands wherein the device is suitable to perform a step selected from the group consisting of measuring the gap between two rollers in a guide box for rolled stock, measuring the gap between two rolls of a stand, verifying the alignment between two guide boxes, verifying the alignment between a box and a stand, and verifying the alignment between two stands.

11. The device as in claim 1, wherein the processor is a processor for displaying in a form of numerical value indicative of the displacements to be made, at least for the dimensions of height, width, and interaxis, of the variable-position elements to obtain the transit gap corresponding to the preselected sample mask.

12. The device as in claim 1, further comprising a common base, wherein said variable-position elements, said visual recording means and at least one light source are coupled to, and supported at, fixed and pre-set positions on the common base.

13. The device as in claim 1, wherein the sample mask is a digital image.

14. The device as in claim 1, wherein the sample mask is a drawing made with a CAD program.

15. The device as in claim 1, wherein the sample mask is displayed on the display means.

16. A method to control the size and profile of a gap between substantially static elements with a variable reciprocal position used to adjust the reciprocal position of said elements to obtain a desired transit gap, comprising the steps of:

obtaining an image of the actual transit gap defined between said variable-position elements by means of visual recording means, sending the image to a processor, employing said processor to compare said image with a pre-selected sample mask, and calculating and displaying a plurality of dimensional discrepancies between the actual image and the pre-selected sample mask, wherein the dimensional discrepancies are displayed by said processor in a form of numerical values indicative of the displacements to be made, at least for the dimensions of height, width and interaxis, of the variable-position elements to obtain the transit gap corresponding to the preselected sample mask.

17. The method as in claim 16, wherein information on the congruity of the profile of at least a part of the image filmed, with respect to the sample mask, is supplied by supply means.

18. The method as in claim 11, wherein said dimensional discrepancies are displayed by said processor on interface windows, and wherein the values of the discrepancies displayed are progressively reduced until the discrepancies are annulled as a worker gradually adjusts the position of said elements, as filmed by the visual recording means, with respect to the sample mask.

19. The method as in claim 16, wherein the substantially static elements comprise a member of the group consisting of:

two rollers in a guide box for rolled stock, two rolls of a stand, two guide boxes, a box and a stand, and two stands, wherein the method further comprises a step selected from the group consisting of measuring the gap between two rollers in a guide box for rolled stock, measuring the gap between two rolls of a stand, verifying the alignment between two guide boxes, verifying the alignment between a box and a stand, and verifying the alignment between two stands.

* * * * *